(12) United States Patent
Scannell et al.

(10) Patent No.: US 10,882,602 B2
(45) Date of Patent: Jan. 5, 2021

(54) FAIRING EDGE HANDHOLD

(71) Applicant: Bell Helicopter Textron Inc., Fort Worth, TX (US)

(72) Inventors: Brent Scannell, L'ile-Bizard (CA); Thomas Mast, Carrollton, TX (US); Keith C. Pedersen, North Richland Hills, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 329 days.

(21) Appl. No.: 15/965,359

(22) Filed: Apr. 27, 2018

(65) Prior Publication Data
US 2019/0329864 A1    Oct. 31, 2019

(51) Int. Cl.
*B64C 7/00*    (2006.01)

(52) U.S. Cl.
CPC ..................... *B64C 7/00* (2013.01)

(58) Field of Classification Search
CPC ............ B64C 1/24; B64C 27/04; B64C 7/00
USPC ........................................... 244/119
See application file for complete search history.

(56) References Cited

FOREIGN PATENT DOCUMENTS

| EP | 2727832 A1 | 5/2014 |
|----|-----------|--------|
| EP | 3560816 B1 | 4/2020 |
| GB | 1075590 A  | 7/1967 |

OTHER PUBLICATIONS

Bell 525 Relentless (Product Diagram), Bell Helicopter, a Textron Company; Flight International from Flightglobal, Tim Hall (FRAeS, Fort Worth, Texas), Reed Business Information, Published Nov. 12, 2014. (1 page).
Jerry, Dominic, "Analysis: Bell 525 Relentless Cutaway and Technical Description", Flight Global, Flight International, Bell Helicopter, Published Nov. 12, 2014. (8 pages).
EPO Examination Report issued in EP Application Serial No. 18184589.2 dated Jan. 11, 2019, 6 pages.
EPO Search Report issued in EP Application Serial No. 18184589.2 dated Dec. 14, 2018, 4 pages.
Mueller Environmental Designs Inc., Fred Mueller, President, "Fundamental of Gas Solids/Liquids Separation," printed on Apr. 12, 2018, 15 pages; http://www.muellerenvironmental.com/.

*Primary Examiner* — Claude J Brown
(74) *Attorney, Agent, or Firm* — Patent Capital Group (57) ABSTRACT

A fairing is provided in one example embodiment and may include a first edge portion to provide a first clearance distance between the fairing and rotor flight controls of a rotorcraft; a second edge portion to provide a second clearance distance between the fairing and the rotor flight controls of the aircraft, wherein the second clearance distance is greater than the first clearance distance; and a support structure attached to the fairing below the second edge portion. A rotorcraft is provided in another example embodiment and may include a fairing in which the fairing can include a handhold portion along an edge of the fairing. The handhold portion can include a handhold clearance distance between the handhold portion and rotor flight controls of the rotorcraft; and a support structure attached to the fairing below the handhold portion.

19 Claims, 7 Drawing Sheets

FAIRING EDGE HANDHOLD

TECHNICAL FIELD

This disclosure relates in general to the field of aircraft and, more particularly, though not exclusively, to a fairing edge handhold for an aircraft.

BACKGROUND

In general, an outer mold line (OML) is an aerodynamic outer surface of an aircraft that reduces aerodynamic drag and provides an aerodynamic path for air to flow around the aircraft during flight. The OML includes many contiguous surfaces of different components, cowlings, and/or fairings. Cowling or fairing assemblies can be used for general drag reduction, to provide an aerodynamic flow path from the exterior of the aircraft to aircraft components, and/or for decorative purposes. Some aircraft include cowling or fairing assemblies configured to protect propulsion related components and/or drivetrain components. Inspection and/or maintenance of an aircraft typically involve personnel accessing aircraft components via cowling or fairing assemblies. It may be challenging, however, to access aircraft components without special equipment to gain such access.

SUMMARY

Most aircraft have fairings. Larger aircraft need maintainers to crawl on the aircraft. If maintainers crawl on the aircraft, handhold and steps need to be incorporated into the fairings. By adding additional structure and clearances, an edge of a fairing can be made into a suitable handhold that may not be damaged with use. For example, according to one aspect of the present disclosure, a fairing may be provided and may include a first edge portion to provide a first clearance distance between the fairing and rotor flight controls of a rotorcraft; a second edge portion to provide a second clearance distance between the fairing and the rotor flight controls of the aircraft, wherein the second clearance distance is greater than the first clearance distance; and a support structure attached to the fairing below the second edge portion. The second edge portion and the support structure can provide a handhold to receive a hand traffic load on the fairing.

According to another aspect of the present disclosure, a rotorcraft may be provided and may include a fairing in which the fairing can include a handhold portion along an edge of the fairing. The handhold portion can include a handhold clearance distance between the handhold portion and rotor flight controls of the rotorcraft; and a support structure attached to the fairing below the handhold portion. A hand traffic load may be received at the handhold portion of the fairing. In some cases, the handhold portion can be a first handhold portion on a first side of the fairing and the rotorcraft can further have a second handhold portion on a second side of the fairing.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, elements, members, apparatuses, etc. described herein may be positioned in any desired orientation. Thus, the use of terms such as 'above', 'below', 'along', 'upper', 'lower', 'top', 'bottom', 'beside', and/or other similar terms to describe a spatial relationship between and/or among various components and/or to describe the spatial orientation of aspects of such components, should be understood to describe a relative relationship between and/or among the components and/or a spatial orientation of aspects of such components, respectively, as the components described herein may be oriented in any manner. When used to describe a range of dimensions or other characteristics (e.g., time, pressure, distance, temperature, etc.) of an element, operations, and/or conditions, the phrase 'between X and Y' represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1:
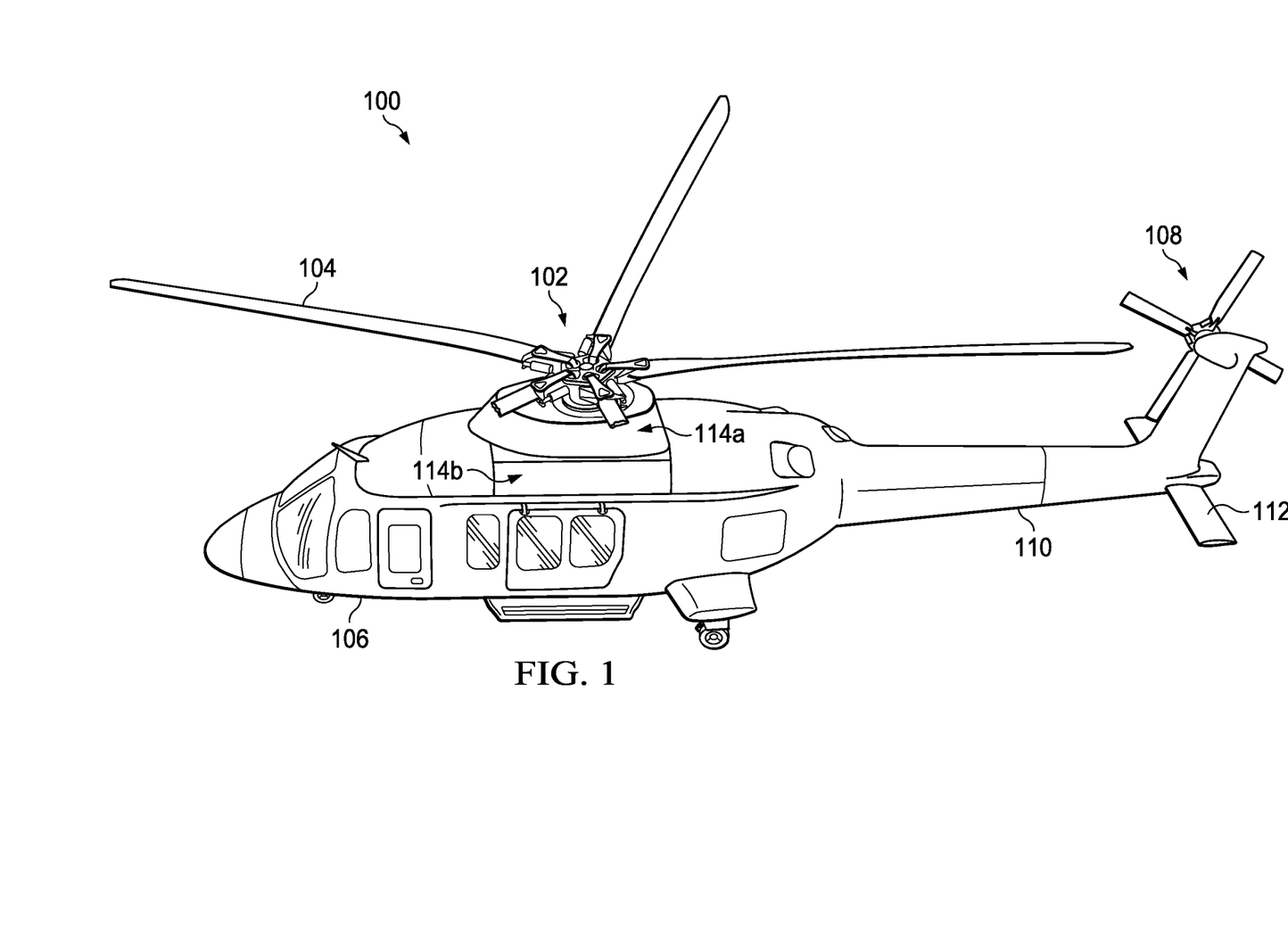
FIG. 1 is simplified diagram of an example rotorcraft, in accordance with certain embodiments.

FIG. 1 illustrates an example embodiment of a rotorcraft 100. FIG. 1 portrays a simplified side view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, a tail rotor or anti-torque system 108, an empennage 110, and a tail structure 112. The fuselage 106 is the main body of the rotorcraft, which may include a cabin (e.g., for crew, passengers, and/or cargo) and/or may house certain mechanical and electrical components (e.g., engine(s), transmission, and/or flight controls). In the illustrated embodiment, tail structure 112 may be used as a horizontal stabilizer. Torque is supplied to rotor system 102 and anti-torque system 108 using at least one engine and at least one gearbox.

The rotorcraft 100 includes a variety of fairing and/or cowling assemblies configured to cover or protect components of the rotorcraft and reduce aerodynamic drag. An example upper fairing assembly 114a (more generally referred to as upper fairing 114a) is arranged above and/or around unillustrated rotor system 102 components (e.g., swashplates, rotor pitch links, pitch control arms, etc.) and may, at least in part, cover and protect the components. In some instances, the upper fairing 114a may be referred to as a sail fairing. An example lower fairing assembly 114b (more generally referred to as lower fairing 114b) is arranged below the upper fairing 114a. The lower fairing 114b may, at least in part, cover and protect, for example, one or more engines and various drivetrain components. In some instances, the lower fairing 114b may be referred to as a transmission fairing or walkway. The upper fairing 114a and the lower fairing 114b may further provide relatively smooth outer surfaces that reduce aerodynamic drag experienced by the rotorcraft 100. As referred to herein in this Specification, the terms 'cowling', 'fairing', 'cowling assembly', and 'fairing assembly' may be used interchangeably.

Some fairings can provide access to components for a rotorcraft. The components may be covered (partially or fully) and/or uncovered. For example, some components of the rotor system 102 may be fully or partially covered or exposed by the upper fairing 114a and may be accessible via the fairing. During inspection and/or maintenance of rotorcraft components, a fairing may have loads applied to it by a person (e.g., the weight of the person). Such loads can include loads resulting from foot traffic (referred to herein as 'foot traffic loads') and/or loads resulting from hand traffic (referred to herein as 'hand traffic loads'). Foot traffic loads may be caused by a person walking on, standing on, squatting on, climbing on, kneeling on, and/or otherwise traversing (sometimes referred to as 'scampering') a fairing using one or both feet or one or both knees (e.g., in a kneeling position). For example, a person can kneel, squat, or stand on the upper fairing 114a to access rotors above the fairing and/or rotor system components accessible via the fairing. Hand traffic loads may be caused by a person climbing on, leaning on, kneeling on, grabbing, and/or otherwise traversing a fairing (e.g., upper fairing 114a) using one or both hands. In some cases, other loads can be applied to a fairing such as, for example, components, tools, etc. being sat or places on a fairing during inspection and/or maintenance.

Fairings have, in the past, been constructed of aluminum or other light-weight metals, but are more recently increasingly being constructed from composite materials, such as carbon fiber reinforced polymer (CFRP). Typically, no provision for grabbing the loose edge of a fairing would be made for the upper fairing of a rotorcraft (e.g., the edge of the upper fairing that includes a cutout portion for rotor flight controls of the rotor system) and the practice of using the fairing and/or the edge of the fairing for scampering would be prohibited as it would likely damage the fairing. Further, the thin edge of the fairing cutout could also be hazardous to grab and pull against.

The present disclosure describes various embodiments for providing a fairing edge handhold that includes integrated support features that provide structural support for supporting hand traffic loads that may be received by the fairing edge along the handhold. In at least one embodiment, a fairing edge handhold may be provided for an upper fairing of a rotorcraft. The upper fairing may include a first edge portion that provides a first clearance distance between an edge of the fairing and rotor flight controls of the rotorcraft, a second edge portion (e.g., a fairing edge handhold) that provides a second clearance distance between the rotor flight controls of the rotorcraft, and a support apparatus attached to the underside of the upper fairing below the second edge portion to provide structural support along the second edge portion for receiving and supporting hand traffic loads along the second edge portion of the upper fairing without causing damage to the upper fairing. The second clearance distance may be greater than the first clearance distance in that the second clearance distance may provide a clearance width that is sufficient for a person to engage one or more hands (gloved or ungloved) along the second edge portion of the upper fairing (e.g., to grab, grip, wrap around, hold on to, etc. the second edge portion of the fairing) and not come in contact with the rotating rotor flight controls of the rotor system.

Embodiments described throughout this disclosure may provide numerous technical advantages including, but not limited to, providing a fairing edge handhold that includes structural support features that facilitate receiving and supporting hand traffic loads along the edge of the fairing, which can facilitate scampering or other movement about the upper fairing without damaging the upper fairing.

Example embodiments associated with a fairing edge handhold that includes integrated support features for the upper fairing of a rotorcraft are described below with more particular reference to the remaining FIGURES. It should be appreciated that rotorcraft 100 of FIG. 1 is merely illustrative of a variety of aircraft in which a fairing edge handhold may be used in accordance embodiments of the present disclosure. Other aircraft in which a fairing edge handhold may be used can include, for example, fixed wing airplanes, hybrid aircraft, unmanned aircraft, gyrocopters, a variety of helicopter configurations, and drones, among other examples.

Figure 2A:
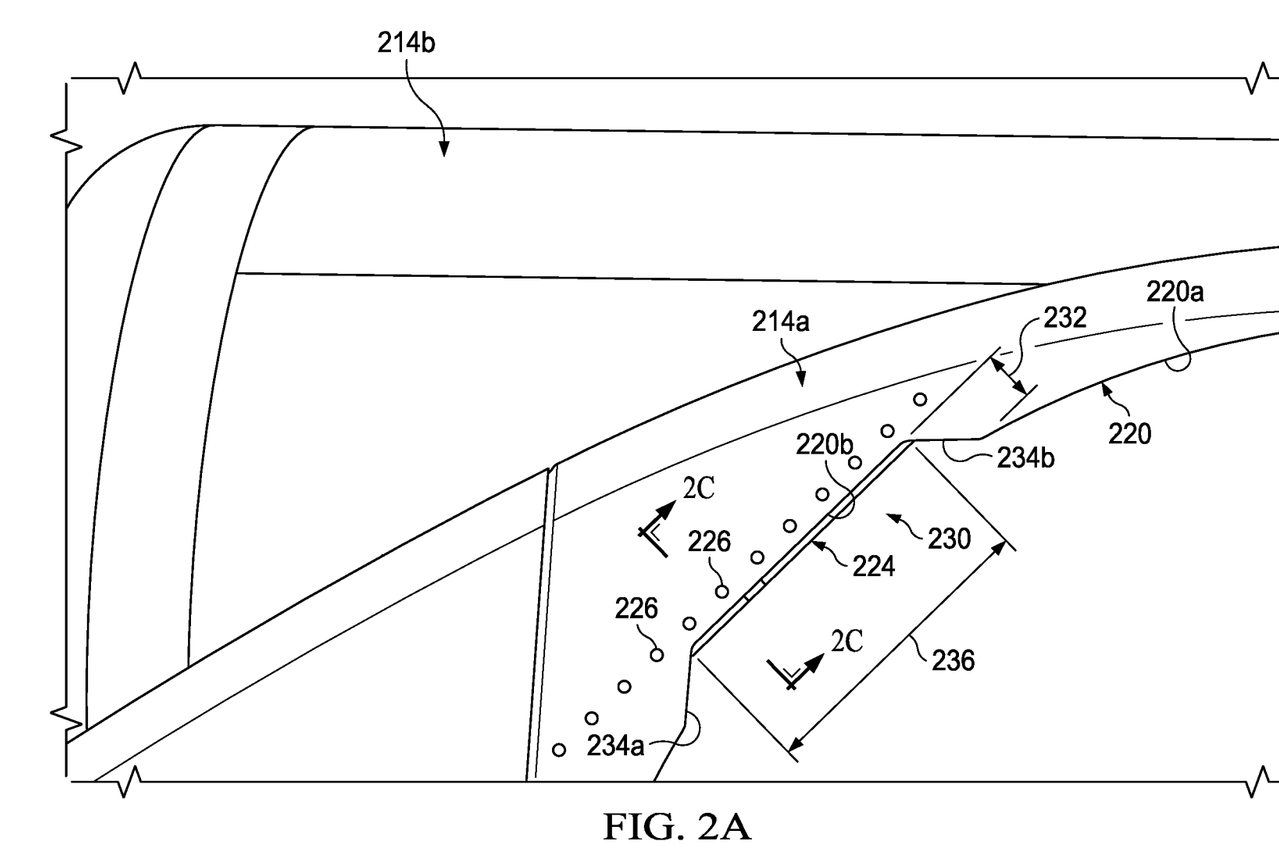
FIG. 2A is a simplified top view diagram illustrating example details associated with an example fairing edge handhold of an example rotorcraft, in accordance with certain embodiments.
Figure 2B:
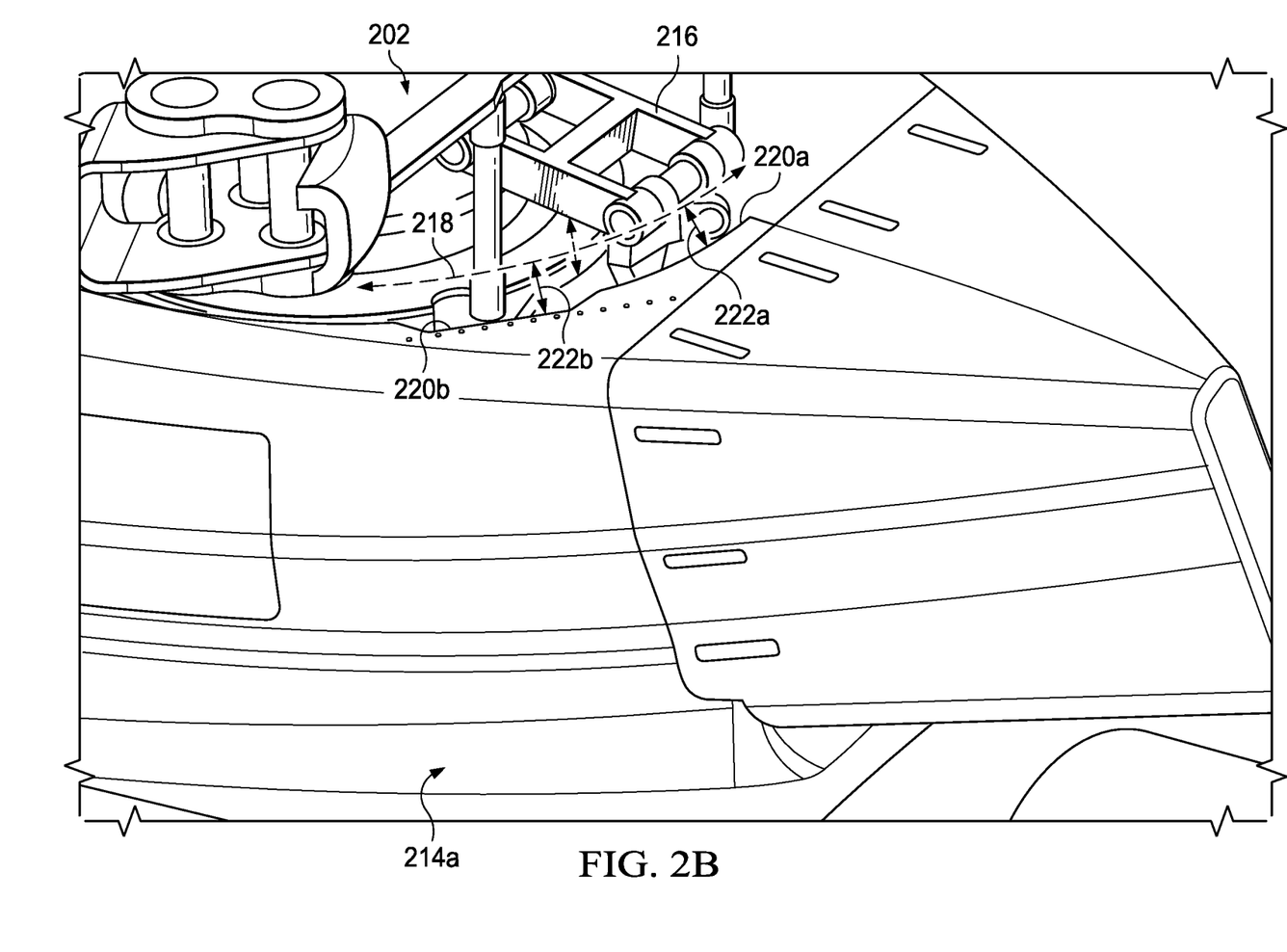
FIG. 2B is a simplified isometric view diagram illustrating example details associated with the example fairing edge handhold of FIG. 2A, in accordance with certain embodiments.
Figure 2C:
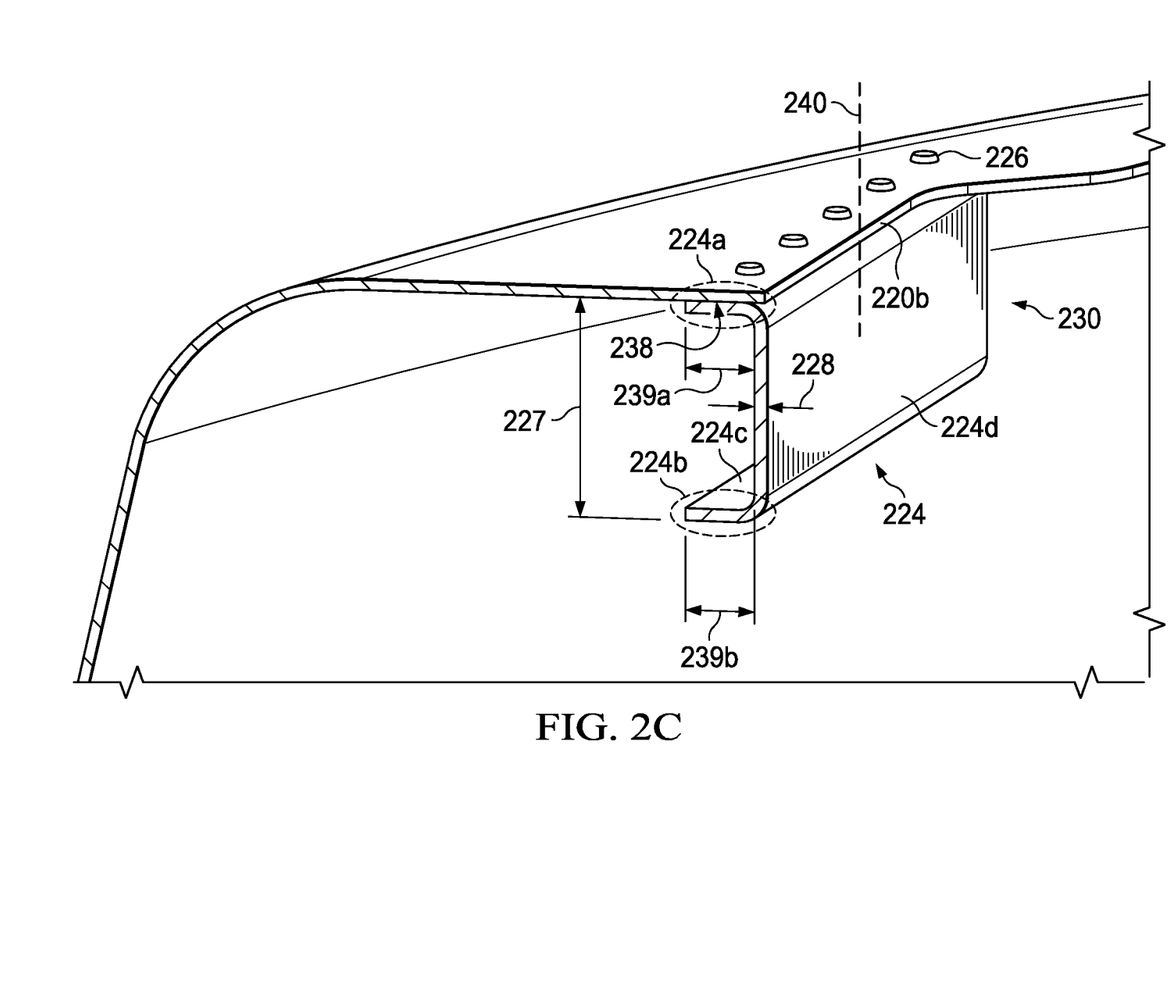
FIG. 2C is a simplified side, cross-sectional view diagram illustrating example details of the example fairing edge handhold of FIGS. 2A-2B, in accordance with certain embodiments.

Referring to FIGS. 2A-2C, FIGS. 2A-2C illustrate various example details associated an example fairing edge handhold 230 of an upper fairing 214a of a rotorcraft, in accordance with certain embodiments. Referring to FIG. 2A, FIG. 2A is a simplified top view diagram illustrating example details associated with the example fairing edge handhold 230 for the upper fairing of the rotorcraft, in accordance with certain embodiments. A lower fairing 214b is also illustrated in FIG. 2A. In at least one embodiment, the upper fairing 214a may correspond to upper fairing 114a of the rotorcraft 100 of FIG. 1 and the lower fairing 214b may correspond to the lower fairing 114b of the rotorcraft 100 of FIG. 1. Referring to FIG. 2B, FIG. 2B is a simplified isometric view diagram illustrating example details associated with the example fairing edge handhold 230 of FIG. 2A, in accordance with certain embodiments. Referring to FIG. 2C, FIG. 2C is a simplified side, cross-sectional view diagram illustrating example details of the example fairing edge handhold 230 of FIGS. 2A-2B, in accordance with certain embodiments. The cross-section of FIG. 2C is cut along a line as generally indicated by the lines labeled '2C' in FIG. 2A. Reference to FIGS. 2A-2C will be made to discuss various features of the fairing edge handhold 230. As referred to herein in this Specification, a fairing edge handhold (e.g., fairing edge handhold 230) can also be referred to as a handhold portion of a fairing.

The upper fairing 214a can be formed (e.g., cutout or otherwise machined, fabricated, etc.) to have a fairing edge 220 that includes a first edge portion 220a and a second edge portion 220b. The first edge portion 220a may provide a first clearance distance 222a between the first edge portion 220a and the motion envelope 218 of rotating rotor flight controls 216 of a rotor system 202 of the rotorcraft (as shown in FIG. 2B) [the rotating rotor flight controls 216 are not shown in FIGS. 2A, 2C, and 3 in order to illustrate other features of the fairing edge handhold 230]. The first clearance distance 222a may be sufficient to allow the rotating rotor flight controls 216 to move (e.g., outwards toward the edge of the upper fairing), rotate (e.g., clockwise or counterclockwise around the axis of rotation for the rotor system 202), etc. about the motion envelope 218 of the rotating rotor flight controls 216 without contacting the first edge portion 220a of the upper fairing 214a. In various embodiments, the first clearance distance 222a may between 1 inch and 2 inches; however, other clearance distances can be envisioned. For example, a general best practice for the first clearance distance is 1 inch beyond the worst case motion envelope of the rotating components (e.g., 216). The worst case motion envelope can include situations where the upper fairing itself has deflected due to normal aerodynamic loading and the motion envelope of the rotating controls has shifted due to the non-rigid nature of the transmission mounting system, in a hard cornering maneuver, for example. More clearance distance may be safer; however, more clearance distance can impose aerodynamic penalties. Accordingly, the first clearance distance 222a may typically be in a range of 1 inch to 2 inches; however, other clearance distances may be envisioned.

The second edge portion 220b of the upper fairing 214a may provide a second clearance distance 222b between the second edge portion 220b and the motion envelope 218 of the rotating rotor flight controls 216. The second clearance distance 222b is greater than the first clearance distance 222a. The second clearance distance 222b may be sufficient to allow a hand or hands (gloved or ungloved) of a person to be received along the second edge portion 220b (e.g., for grabbing, etc. the fairing edge handhold 230) of the upper fairing 214a while also allowing the rotating rotor flight controls 216 to move, rotate, etc. about the rotor system 202 without contacting a hand or hand(s) engaged along the second edge portion 220b. Thus, the second clearance distance 222b may represent a handhold clearance distance, which may provide clearance for a person to grab or otherwise engage (using one or more hands) the upper fairing 214a via the fairing edge handhold 230. The second clearance distance 222b can be a function of what is needed to provide a relatively flat and ergonomic gripping surface along the top side of the upper fairing 214a and can depend on the first clearance distance 222a provided for the first edge portion 220a of the upper fairing 214a.

For example, the fairing edge handhold 230 may have a clearance width 232 that may represent a cutout distance as measured between the first edge portion 220a and the second edge portion 220b of the fairing edge 220. The fairing edge handhold 230 can include end portions 234 including a first end portion 234a and a second end portion 234b in which each end portion 234a, 234b represent a transition of the fairing edge between the first edge portion 220a and the second edge portion 220b. The distance between the first and second end portions 234a, 234b may represent a length 236 of the fairing edge handhold 230. In various embodiments, the length 236 of the fairing edge handhold 230 may range between 4 inches and 12 inches; however, other lengths can be envisioned depending on applications and/or implementations. For example, in at least one embodiment, the length 236 may be 9 inches.

The length 236 of the fairing edge handhold 230 can represent a cutout diameter for the fairing edge handhold 230. The clearance width 232 may be varied depending on the cutout diameter, which can affect the ergonomic gripping surface of the fairing edge handhold. For example, a smaller diameter cutout (smaller length between the end portions 234a, 234b of the fairing edge handhold) may result in a larger offset (larger clearance width) between the first clearance distance and the second clearance distance, and vice-versa, to provide a sufficiently flat ergonomic gripping surface for the fairing edge handhold 230 along the top side of the upper fairing 214a. Thus, various ergonomic considerations may impact the clearance width 232 and/or length 236 of the fairing edge handhold 230 in accordance with various embodiments described herein.

In various embodiments, the clearance width 232 may range between 1 inch and 3 inches; however, other clearance widths can be envisioned depending on applications and/or implementations. In various embodiments, the second clearance distance 222b can range between 2 inches and 5 inches; however, other clearance distances can be envisioned depending on applications and/or implementations.

To support various hand traffic loads, the fairing edge handhold 230 may include a support structure 224 attached to the bottom side of upper fairing 214a below the second edge portion 220b of the upper fairing 214a. The support structure 224 may be attached to the bottom side of the upper fairing 214a along an attachment interface 238 (shown in FIG. 2C). As illustrated in FIG. 2B, at least a portion of the fairing edge handhold 230 may be aft of the rotor flight controls 216 of the rotor system 202.

In at least one embodiment, the support structure 224 may include a top member 224a, a bottom member 224b, an inner surface 224c, and an outer surface 224d (as illustrated in FIG. 2C). In at least one embodiment, the top member 224a and the bottom member 224b of the support structure may be rolled or otherwise fabricated, machined, etc. to form C-channel shape for the support structure (e.g., the top member 224a and the bottom member 224b may be parallel to each other); however, in other embodiments, the support structure 224 can be fabricated to have other shapes (e.g., the top member 224a and the bottom member 224b may not be parallel to each other). The top member 224a may have a width 239a and the bottom member 224b may have a width 239b. The widths 239a, 239b can be the same or different from each other. In various embodiments, the widths 239a, 239b may vary between 0.125 inches and 2 inches; however, other widths can be envisioned depending on applications and/or implementations.

Figure 6:
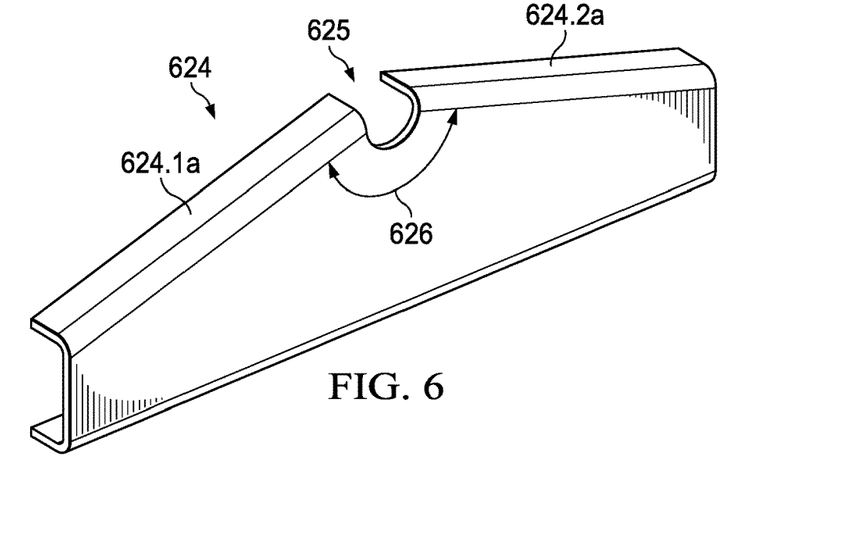

The support structure 224 may have a height 227 and a thickness 228. In various embodiments, the height 227 may range between 0.5 inches and 5 inches. For example, in at least one embodiment, the height 227 may be 3 inches. In some embodiments, the height 227 may be substantially uniform across the length 229 (illustrated in FIG. 3) of a support structure; however, in other embodiments, the height 227 may not be uniform across the length 229 of a support structure (e.g., as illustrated in FIG. 6). In various embodiments, the thickness 228 may range between 0.030 inches and 0.40 inches; however, other thicknesses can be envisioned depending on applications and/or implementations. For example, in at least one embodiment, the thickness may be 0.0625 inches.

The top member 224a of the support structure 224 may be attached below the second edge portion 220b of the upper fairing 214a (e.g., on the bottom side of the upper fairing 214a) along the attachment interface 238 using fasteners 226, as shown in FIG. 2C. In at least one embodiment, the outer surface 224d of the support structure 224 may be positioned below the second edge portion 220b of the upper fairing 214a along a vertical plane 240 (indicated by the dashed-line) that may be aligned with (e.g., created by) the second edge portion 220b of the fairing edge 220 such that a smooth or approximately smooth transition between the second edge portion 220b of the fairing edge 220 and the outer surface 224d of the support structure 224 may be provided (e.g., so that overhang between the second edge portion 220b of the upper fairing 214a and the outer surface 224d of the support structure 224 may be minimized). In essence, the combination of the support structure 224 along the second edge portion 220b of the upper fairing 214a may create an ergonomic gripping surface, similar to a rolled edge, that can include the top side of the upper fairing 214a and the outer surface 224d of the support structure 224, which can enhance the ability for a person or persons to grip or otherwise engage the fairing edge handhold 230 using one or more hands and/or fingers.

In some embodiments, the top member 224a of the support structure 224 may be fabricated with an angle relative to the vertical plane 240 such that the support structure 224 angles in an outward direction away from the rotating rotor controls 216 to provide additional clearance for the rotating rotor flight controls 216 and/or other dynamic elements under the fairing, without significantly compromising the structural value of the support structure 224 and/or grip ergonomics of the fairing edge handhold 230.

Although a C-channel shape is illustrated for the support structure 224 in the embodiment of FIG. 2C, it is to be understood that a support structure for a fairing edge handhold may be fabricated to have any shape, configuration, etc. (e.g., fully boxed, curved, solid, having uniform height, having non-uniform height, etc.) and, thus, any other shapes, configurations, etc. for a support structure are clearly within the scope of the present disclosure. In various embodiments, support structure 224 may be composed of any suitable materials including, but not limited to, a plastic, reinforced plastic, metal and/or metal alloy (e.g., aluminum, steel, alloys, etc.), fiberglass, reinforced fiberglass, composite materials (e.g., a carbon composite such as a CFRP), combinations thereof, or the like. In various embodiments, the support structure 224 may be formed using any suitable process including, but not limited to, metal fabrication and/or machining, compression molding, composite fabrication, combinations thereof, or the like.

In various embodiments, fasteners 226 may be rivets, screws, bolts, combinations thereof, or the like to provide a means for attaching the support structure 224 to the upper fairing 214a. In some embodiments, an adhesive and/or co-cured composite may be used alone and/or in addition to using fasteners 226 to attach the support structure 224 to the bottom side of the upper fairing 214a.

Figure 3:
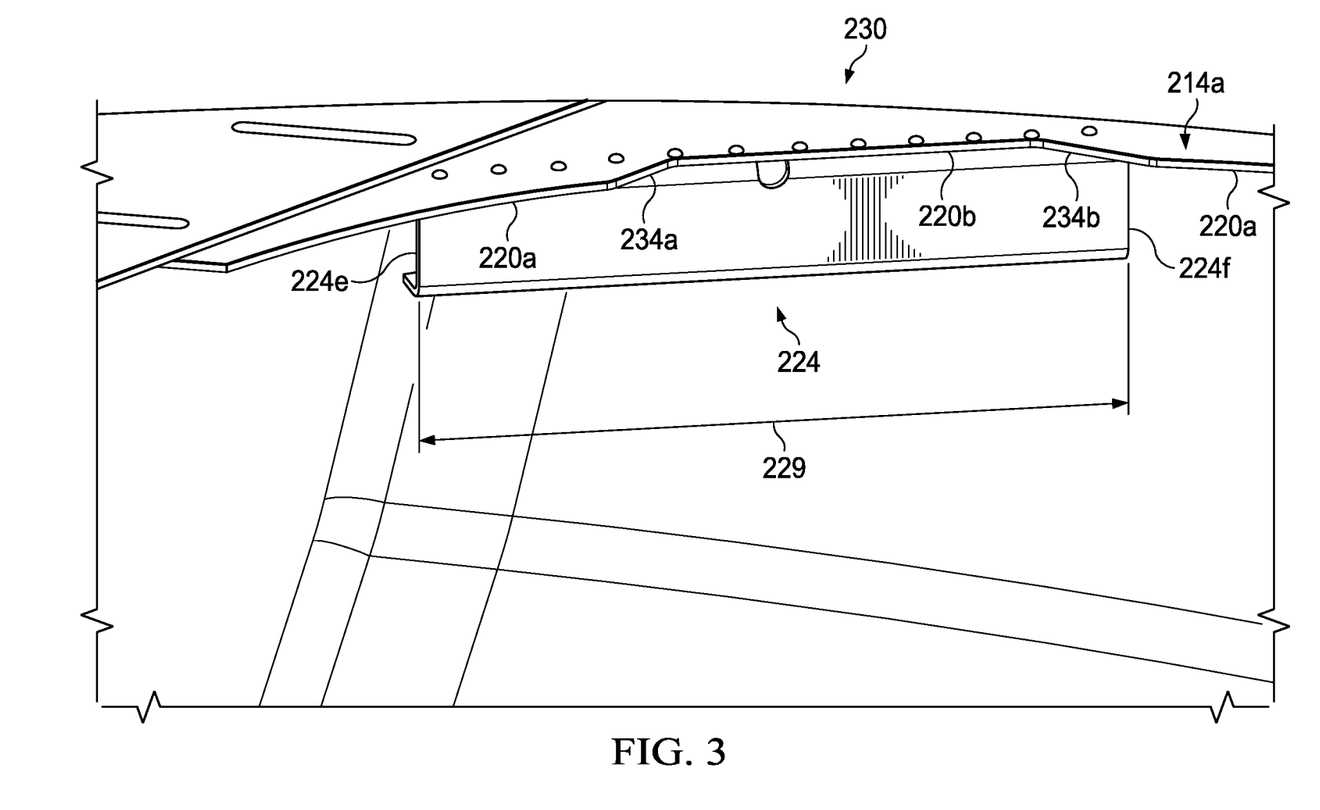
FIG. 3 is a simplified isometric view diagram illustrating other example details associated with the example fairing edge handhold of FIGS. 2A-2C, in accordance with certain embodiments.

Referring to FIG. 3, FIG. 3 is a simplified isometric view diagram illustrating other example details associated with the example fairing edge handhold 230 of FIGS. 2A-2C, in accordance with certain embodiments. As illustrated in the embodiment of FIG. 3, the support structure 224 can include a first end 224e and a second end 224f. The first end 224e of the support structure 224 may extend beyond the first end portion 234a of the fairing edge handhold 230 along the attachment interface 238 and the second end 224f of the support structure 224 may extend beyond the second end portion 234b of the fairing edge handhold 230 along the attachment interface 238. Thus, the support structure 224 may have an overall length 229 that is greater than the length 236 of the fairing edge handhold 230. In various embodiments, each of the first and second ends 224e, 224f of the support structure 224 may extend beyond each of the first and second end portions 234a, 234b of the fairing edge handhold 230 at distances between 1 inch and 12 inches depending on the length 236 and/or the clearance width 232 of the fairing edge handhold 230 and/or the overall dimensions, size, etc. of the upper fairing 214a and/or the cutout of the first edge portion 220a.

In at least one embodiment, the ends 224e, 224f of the support structure 224 may be extended beyond the end portions 234a, 234b of the fairing edge handhold 230 to improve structural rigidity of the upper fairing 214 for supporting hand traffic loads along the fairing edge handhold 230, which may minimize the potential for causing damage to the upper fairing 214a via such hand traffic loads. In various embodiments, the fairing edge handhold 230 may be capable of supporting "rough handling" loads on the upper fairing 214a.

Figure 4:
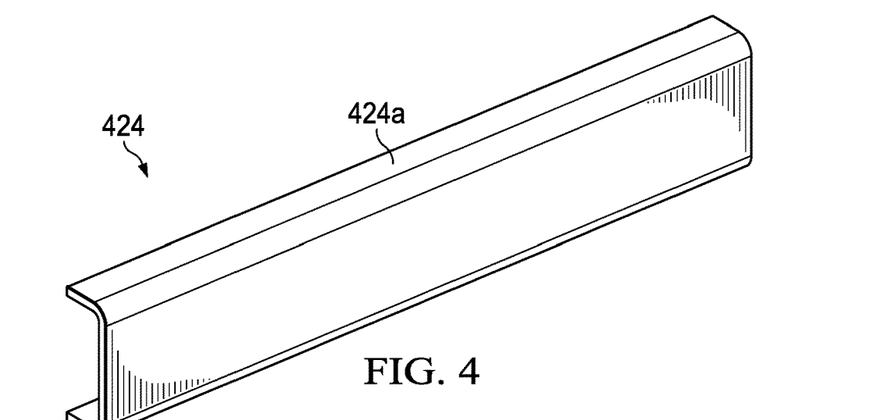
FIGS. 4-6 are simplified isometric view diagrams illustrating example details associated with various fairing edge handhold support structure configurations, in accordance with certain embodiments.
Figure 5:
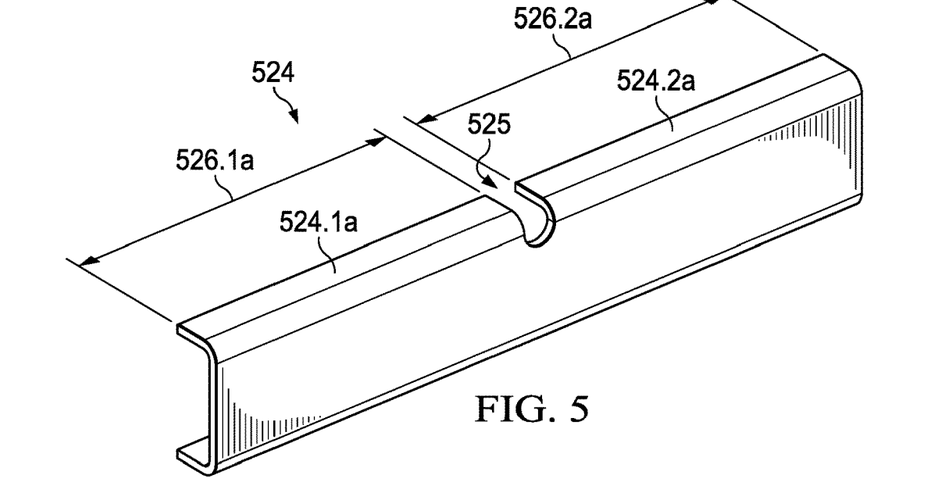

Referring to FIGS. 4-6, FIGS. 4-6 are simplified isometric view diagrams illustrating example details associated with various fairing edge handhold support structure configurations, in accordance with certain embodiments. Referring to FIG. 4, FIG. 4 is a simplified isometric view diagram illustrating example details associated with an example support structure 424 for a fairing edge handhold (not shown), in accordance with certain embodiments. As illustrated in FIG. 4, the example support structure 424 may include a single top member 424a that includes a single portion across the top of the support structure 424.

Referring to FIG. 5, FIG. 5 is a simplified isometric view diagram illustrating example details associated with another example support structure 524 for a fairing edge handhold (not shown), in accordance with certain embodiments. As illustrated in FIG. 5, the example support structure 524 may include at least two top member portions, including a first top member portion 524.1a having a first length 526.1a and a second top member portion 524.2a having a second length 526.2a in which the two portions are separated by at least one notch 525. In various embodiments, the first length 526.1a and the second length 526.2a may be the same or different, which means that the notch (or notches, depending on the number of top member portions) may or may not be equidistant from each end of the support structure 524. In at least one embodiment, multiple top member portions (e.g., 524.1 and 524.2) of a support structure (e.g., support structure 524) may allow for the ability to mount the support structure to an upper fairing that has a curvature along the attachment interface between then fairing and the support structure. Although separate member portions 524.1a and 524.2a are illustrated in FIG. 5 as being coplanar, in some embodiments, the separate member portions 524.1a and 524.2a may be non-coplanar, such that there may be a small relative angle between them. For example, 524.1a and 524.2a may be fabricated as "flat" approximations of the curvature that they are intended to interface with along the attachment interface of the bottom side of the upper fairing, which may allow for more relaxed manufacturing tolerances for the support structure and/or the upper fairing. In contrast, the example support structure 424 (having only a single top member portion 424a) could only be used with a fairing having little or no curvature at the attachment interface.

Referring to FIG. 6, FIG. 6 is a simplified isometric view illustrating example details associated with yet another example support structure 624 for a fairing edge handhold (not shown), in accordance with certain embodiments. As illustrated in FIG. 6, the example support structure 624 may include at least two top member portions 624.1a and 624.2a separated by at least one notch 625. As illustrated in FIG. 6, top member portions 624.1a and 624.2a can be non-coplanar with an angle 626 between them relative to notch 625. The example support structure 624 may be capable of being attached to an upper fairing that has a curvature along the attachment interface between the bottom side of the fairing and the top member portions 624.1a and 624.2a. In various embodiments, the angle 626 may range between 3 degrees and 45 degrees; however, other angles (in one or more directions) between any number of top member portions and notches can be envisioned depending on applications and/or implementations. The example support structure 624 is only one example of a support structure that may accommodate a curvature of an upper fairing. Virtually any curvature of a fairing could be accommodated by a support structure having any number of top member portions and notches in accordance with embodiments described herein.

Figure 7:
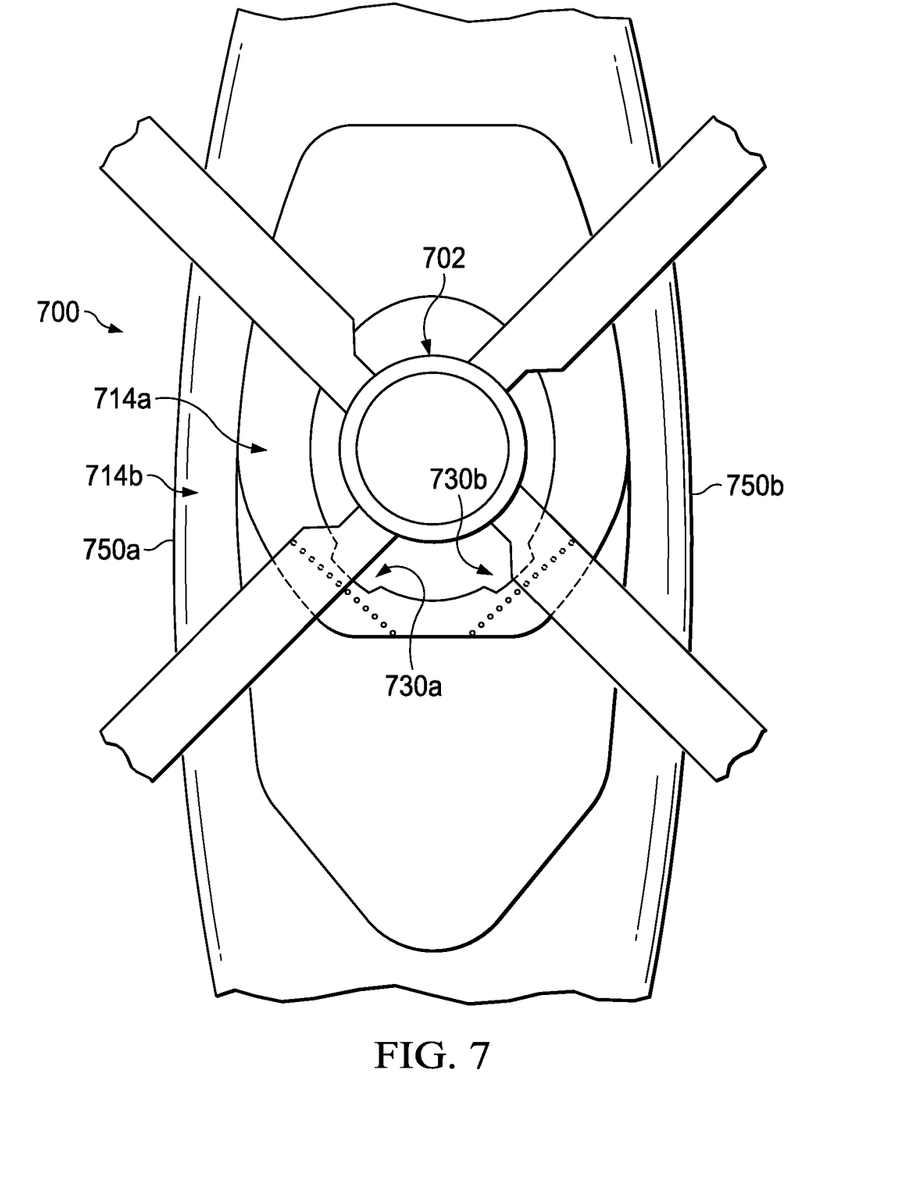
FIG. 7 is a simplified top view of an example rotorcraft having example fairing edge handholds on each side of the example rotorcraft, in accordance with certain embodiments.

Referring to FIG. 7, FIG. 7 is a simplified top view of an example rotorcraft having example fairing edge handholds on each side of the example rotorcraft, in accordance with certain embodiments. In particular, FIG. 7 illustrates a top view of a portion of a rotorcraft 700 and its rotor system 702. The rotorcraft 700 may include an upper fairing assembly 714a and a lower fairing assembly 714b. The upper fairing assembly 714a may include a first fairing edge handhold 730a on a first side 750a of the rotorcraft 700 and a second fairing edge handhold 730b on a second side 750b of the rotorcraft 700. The first and second fairing edge handholds 730a, 730b may be aft of at least a portion of the rotor system 702 (e.g., the rotor hub, certain rotating rotor flight controls, etc.) along the edges of the upper fairing 714a of the rotorcraft 700.

The diagrams in the FIGURES illustrate the architecture, functionality, and operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A sail fairing for a rotorcraft comprising:
a first edge portion configured to provide a first clearance distance between the sail fairing and rotor controls of the rotorcraft;
a second edge portion configured to provide a second clearance distance between the sail fairing and the rotor controls of the rotorcraft, wherein the second clearance distance is greater than the first clearance distance to provide a clearance width that is sufficient to accommodate at least one hand of a person along the second edge portion; and
a support structure attached to an attachment interface of the sail fairing below the second edge portion;
wherein the second edge portion and the support structure provide a handhold configured to support a hand traffic load on the sail fairing.

2. The sail fairing of claim 1, wherein the support structure has a height between 0.5 inches and 5 inches.

3. The sail fairing of claim 1, wherein the support structure comprises one or more of aluminum, steel, a metal alloy, plastic, reinforced plastic, fiberglass, reinforced fiberglass, and a carbon composite.

4. The sail fairing of claim 1, wherein the second edge portion has a length between 4 inches and 12 inches.

5. The sail fairing of claim 4, wherein the support structure has a length that is greater than the length of the second edge portion.

6. The sail fairing of claim 1, wherein the support structure has an outer surface and an inner surface, and the outer surface is positioned along a vertical plane that is aligned with the second edge portion of the fairing for a length of the second edge portion.

7. The sail fairing of claim 1, wherein the support structure comprises a top member and a bottom member, and the top member is attached to a bottom side of the fairing.

8. The sail fairing of claim 7, wherein the top member of the support structure comprises at least two portions.

9. A rotorcraft comprising:
a sail fairing, the sail fairing comprising a handhold portion along an edge of the sail fairing, the handhold portion comprising:
a first edge portion configured to provide a first clearance distance between the sail fairing and rotor controls of the rotorcraft;
a second edge portion configured to provide a second clearance distance between the sail fairing and the rotor controls of the rotorcraft, wherein the second clearance distance is greater than the first clearance distance to provide a handhold clearance distance comprising a clearance width that is sufficient to accommodate at least one hand of a person along the second edge portion; and
a support structure attached to an attachment interface of the sail fairing below the second edge portion;
wherein the second edge portion and the support structure provide a handhold configured to support a hand traffic load on the sail fairing.

10. The rotorcraft of claim 9, wherein the support structure has a height between 0.5 inch and 5 inches.

11. The rotorcraft of claim 9, wherein the support structure comprises one or more of aluminum, steel, a metal alloy, plastic, a reinforced plastic, fiberglass, reinforced fiberglass, and a carbon composite.

12. The rotorcraft of claim 9, wherein the handhold portion has a clearance width between 1 inch and 3 inches.

13. The rotorcraft of claim 9, wherein the handhold portion has a length between 4 inches and 12 inches.

14. The rotorcraft of claim 9, wherein the support structure has a length that is greater than the length of the handhold portion.

15. The rotorcraft of claim 9, wherein the support structure has an outer surface and an inner surface, and the outer surface is positioned along a vertical plane that is approximately aligned with the handhold portion of the sail fairing for a length of the handhold portion.

16. The rotorcraft of claim 9, wherein the support structure comprises a top member and a bottom member, and the top member is attached to a bottom side of the sail fairing.

17. The rotorcraft of claim 16, wherein the top member of the support structure comprises at least two portions.

18. The rotorcraft of claim 9, wherein the handhold portion is a first handhold portion on a first side of the fairing, the rotorcraft further comprising a second handhold portion on a second side of the sail fairing.

19. The rotorcraft of claim 9, wherein the handhold portion is to receive a hand traffic load on the sail fairing.

* * * * *